(12) United States Patent  (10) Patent No.: US 7,397,147 B2
Jabaji et al.  (45) Date of Patent: Jul. 8, 2008

(54) SYSTEM AND METHOD FOR ELECTRICAL ENERGY SWITCHING AND CONTROL IN A VEHICLE

(75) Inventors: Shadi Jabaji, Morton Grove, IL (US); Issam Jabaji, Morton Grove, IL (US)

(73) Assignee: C. E. Niehoff & Co., Evanston, IL (US)

( * ) Notice: Subject to any disclaimer, the term of this patent is extended or adjusted under 35 U.S.C. 154(b) by 0 days.

(21) Appl. No.: 11/709,077

(22) Filed: Feb. 20, 2007

(65) Prior Publication Data

US 2007/0145825 A1  Jun. 28, 2007

Related U.S. Application Data

(62) Division of application No. 10/867,499, filed on Jun. 14, 2004, now Pat. No. 7,202,574.

(51) Int. Cl.
*B60L 1/00* (2006.01)
(52) U.S. Cl. .................................................... 307/10.1
(58) Field of Classification Search ................. 307/10.1
See application file for complete search history.

(56) References Cited

U.S. PATENT DOCUMENTS

| | | | |
|---|---|---|---|
| 4,016,474 A | 4/1977 | Mason | |
| 4,090,122 A | 5/1978 | Hoinski | |
| 4,100,474 A | 7/1978 | Pfeffer et al. | |
| 4,114,082 A | 9/1978 | Scheidler | |
| 4,156,171 A | 5/1979 | Kofink | |
| 5,162,720 A | 11/1992 | Lambert | |
| 5,225,761 A | 7/1993 | Albright | |
| 5,355,071 A | 10/1994 | Ishida et al. | |
| 5,397,991 A | 3/1995 | Rogers | |
| 5,528,148 A * | 6/1996 | Rogers | 320/137 |
| 6,057,666 A | 5/2000 | Dougherty et al. | |
| 6,215,277 B1 | 4/2001 | Renehan | |
| 6,268,711 B1 | 7/2001 | Bearfield | |
| 6,271,642 B1 | 8/2001 | Dougherty et al. | |
| 6,275,004 B1 | 8/2001 | Tamai et al. | |
| 6,452,361 B2 | 9/2002 | Dougherty et al. | |

* cited by examiner

*Primary Examiner*—Robert L. Deberadinis
(74) *Attorney, Agent, or Firm*—Law Offices of Michael M. Ahmadshahi

(57) ABSTRACT

This invention discloses a device in a vehicle electrical system which determines the vehicle's operating conditions and facilitates the transfer of electrical energy between systems of electrical energy sources and their associated electrical loads based on the vehicle operating conditions. The device further determines the operating conditions of the systems of electrical energy sources and their associated electrical loads and facilitates the transfer of electrical energy between them in accordance with said operating conditions.

20 Claims, 3 Drawing Sheets

SYSTEM AND METHOD FOR ELECTRICAL ENERGY SWITCHING AND CONTROL IN A VEHICLE

CROSS REFERENCE TO RELATED APPLICATIONS

The present patent application is a division of a non-provisional patent application entitled "System and Method for Electrical Energy Switching and Control in a Vehicle," filed Jun. 14, 2004 now U.S. Pat. No. 7,202,574, as U.S. patent application Ser. No. 10/867,499 by the same inventors. This patent application claims the benefit of the filing date of the cited non-provisional patent application according to the statutes and rules governing non-provisional patent applications, particularly 35 USC §§120, 121, and 37 CFR §1.78. The specification and drawings of the cited non-provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to electrical systems comprising two or more stored energy sources. In particular, this invention relates to a device, comprising a system and method, which controllably selects the most optimal energy source available in the electrical system.

BACKGROUND

The present invention relates to electrical systems which comprise electrical loads, various stored energy sources, and one or more electrical energy supplying means such as a generator. More specifically, the present invention focuses on a system and method which may be utilized in electrical networks, such as a vehicle electrical system, where the stored energy sources are controllably configured in such a manner as to facilitate the transfer of maximum available electrical energy in the electrical network to the associated electrical loads in order to satisfy the operating condition requirements. Additionally, the device is configured to controllably transfer electrical energy from a first electrical energy source to one or more electrical energy sources and their respective electrical loads in the electrical system corresponding to the operating condition and in such a way as to avoid overloading or otherwise detrimentally affecting said first electrical energy source.

Electrical systems are typically comprised of a generator, electrical loads, and a stored energy source. The stored energy sources function during the time when the generator is not operating, so as to provide the required electrical energy to the electrical loads. For example in a vehicle electrical system an operating condition may require a generator, which transforms mechanical energy into electrical energy, to supply electrical energy when the vehicle engine is operating, and one or more stored energy sources, such as a battery, to supply electrical energy during the periods when the vehicle engine is not operating. Another example is where a hybrid vehicle operating condition may require its on-board generator to recharge its depleted batteries in addition to providing electrical energy to various electrical devices while the vehicle mechanical engine is operating, and its batteries to provide electrical energy during the periods when the vehicle's mechanical engine is turned off and the vehicle electrical engine is employed to propel and operate the vehicle.

Such traditional electrical systems ordinarily comprise a main and an auxiliary system of stored energy sources. Both the main and auxiliary systems may further be comprised of a series of stored energy sources. For instance, in certain vehicles, the electrical system is configured such that there is a main stored energy source which supplies electrical energy to main electrical loads during engine startup and whenever the generator is not operating but there is an auxiliary stored energy source which provides electrical energy to the auxiliary electrical loads. The main and auxiliary systems are connected to the electrical system in a parallel configuration and may contain switchable means to provide isolation or interconnection of any source of electrical energy to the respective electrical loads.

In such electrical systems the main and auxiliary systems are electrically isolated from each other in a unidirectional manner, meaning that the flow of electrical energy can only take place in a pre-designated direction, for example from the main system to the auxiliary system or vise versa. This is done so a single generator may recharge main and auxiliary batteries simultaneously, but the batteries are unable to discharge into each other. Ordinarily, this is accomplished by incorporating an isolation diode between the generator and each stored energy source.

A common design of vehicle electrical systems is such that the main battery system provides electrical energy to the engine starter to start the engine, and the auxiliary system provides electrical energy to the electrical loads while the vehicle's engine is not operating. In the event that the main system is depleted or otherwise defective, the auxiliary system is incapable of transferring energy to the main system to enable engine cranking unless a manual switch or relay is provided. Similarly, if the auxiliary system has exhausted its energy and there still remains a critical need to provide electrical energy to the electrical loads, the main system is incapable of transferring its energy to the auxiliary system unless a manual switch or relay is provided. Either case of manual switching requires consideration of the circuit effect when inserting a high energy source into an electric circuit that contains a very low source impedance inherent to a discharged battery or a possible short circuit that may have caused battery discharge. This generally leads to a switching means that disconnects or isolates the depleted stored energy source that is being replaced by the one with the higher energy. This still does not adequately address the case of a short circuit that may have caused the initial battery discharge.

Although various systems have been proposed which touch upon some aspects of the above problems, they do not provide solutions to the existing limitations in electrical energy transfer between systems of stored energy sources, generators, and loads. For example, Renehan, U.S. Pat. No. 6,215,277 discloses an electrical charging system which is capable of charging two sets of stored energy sources at different voltages, but does not address bi-directional electrical energy transfer between these sources which is the subject of the present invention. In Lambert, U.S. Pat. No. 5,162,720, the concept of the invention is to provide means for connecting the engine battery, the auxiliary battery, and the supplemental electric current source, and for permitting unidirectional current flow to the engine battery from the supplemental electric current source while the vehicle engine is not operating. The present invention does not require an operational distinction between auxiliary battery and engine battery, and furthermore, the flow of electrical energy from the stored energy sources may occur in either direction. The Hoinsky patent, U.S. Pat. No. 4,090,122 discloses a vehicle electrical system which includes a high capacity storage battery in addition to the standard vehicle battery to be utilized during periods when the vehicle is at rest, but it does not address electrical energy management between such stored energy sources. Consequently, there is a need for an electrical energy source controller that controllably permits electrical isolation between stored energy sources in an electrical system while allowing bidirectional energy transfer between them. Furthermore, the present invention is capable of transferring the maximum electrical energy in the electrical system to the stored energy sources and their associated electrical loads in response to the vehicle operating condition.

In modern vehicle designs an electrical energy source may take on various forms. Mechanical, chemical, and solar energy, among others, may be converted into electrical energy for consumption by vehicle electrical loads. For instance, in a motor vehicle, an electrical energy source usually takes on the form of a generator where mechanical energy is converted into electrical energy. The electrical energy source of a solar-powered vehicle, for example, converts solar energy into electrical energy. Additionally, the electrical energy source is also responsible to provide and maintain the necessary electrical energy in the other electrical energy sources in the system. The first task, i.e. providing electrical energy to the electrical loads, is ordinarily more critical than the second. Modem vehicles rely heavily on their on-board electrical devices. Any disruption in the transfer of energy to such devices may lead to an inoperable vehicle. For instance, a computer-controlled fuel injection system must be operational for the engine to continue operating. A first electrical energy source providing electrical energy to such loads must not be overloaded or otherwise detrimentally affected by the demand of electrical energy from other electrical energy sources or low priority loads. The other electrical energy sources must be disconnected if they become a source of overload for said first electrical energy source. Furthermore, it is desirable to monitor said first electrical energy source such as a generator and extract electrical energy from it whenever it is possible to do so without causing an overload. Therefore, there is a need for an electrical energy source controller which monitors electrical energy sources in a vehicle electrical system and controllably extracts electrical energy from a first electrical energy source to one or more electrical energy sources and their associated electrical loads based on an operating condition requirement.

SUMMARY

The present invention discloses a system and method that permits transfer of electrical energy between systems of electrical energy sources and their associated electrical loads based on an operating condition requirement. Additionally, the system is capable of controllably transferring electrical energy between a first electrical energy source and one or more electrical energy sources and their associated electrical loads consistent with the operating condition requirement and in such a way as to avoid overloading or otherwise detrimentally affecting said first electrical energy source. Preferably, the system is configured such that systems of electrical energy sources and their respective electrical loads may become completely isolated when an operating condition indicates that no electrical energy source is available to share its electrical energy with any other electrical energy source and or electrical load. Preferably, the system is further configured such that when an operating condition makes a first electrical energy source available, electrical energy is extracted and transferred from said first electrical energy source to other electrical energy sources and their associated electrical loads in such a way as to prevent overloading or otherwise detrimentally affecting said first electrical energy source.

In one aspect, a system is disclosed comprising two or more electrical energy sources and a control device connected to and in communication with said electrical energy sources and a vehicle electrical system. The control device is configured to determine an operating condition of the vehicle and to employ an appropriate number of electrical energy sources to satisfy a requirement set by the operating condition. Preferably, the system is configured such that the control device includes means for sensing or receiving a signal from the vehicle electrical system to determine a vehicle operating condition. Such signals may contain information as to the status of the vehicle ignition switch, frequency of an alternating current of a generator in the vehicle, or a message from the vehicle computer network respecting priorities of electrical energy sources and electrical loads.

In another aspect, a system is disclosed comprising two or more electrical energy sources and a control device connected to and in communication with said electrical energy sources and a vehicle electrical system. The control device is configured to determine an operating condition of the vehicle and to employ an appropriate number of electrical energy sources to satisfy a requirement set by the operating condition. Preferably, the system is configured such that the control device includes means for sensing voltages, an energy level, or a rate of deliverable energy of the electrical energy sources, to employ an appropriate number of electrical energy sources.

In another aspect, a system is disclosed comprising two or more electrical energy sources and a control device connected to and in communication with said electrical energy sources and a vehicle electrical system. The control device is configured to determine an operating condition of the vehicle and to employ an appropriate number of electrical energy sources to satisfy a requirement set by the operating condition. Preferably, the system is configured such that the control device includes means to disconnect an electrical energy source in order to satisfy the requirements prescribed by the vehicle operating condition. A decision to disconnect an electrical energy source may be based on a time period during which the vehicle engine is turned off, or on a level of priority associated with said electrical energy source.

In another aspect, a system is disclosed comprising two or more electrical energy sources and a control device connected to and in communication with said electrical energy sources and a vehicle electrical system. The control device is configured to determine an operating condition of a first electrical energy source and selectively to connect or disconnect a second electrical energy source with said first electrical energy source corresponding to the operating condition. Preferably, the system is configured such that the control device includes means for sensing a signal from the vehicle electrical system respecting the status of said first electrical energy source to determine its operating condition. Such signals may contain information as to the energy level of said first electrical energy source or a message from the vehicle computer network respecting the available energy that may be extracted from said first electrical energy source without overloading or detrimentally affecting same.

In another aspect, a system is disclosed comprising two or more electrical energy sources and a control device connected to and in communication with said electrical energy sources and a vehicle electrical system. The control device is configured to determine an operating condition of a first electrical energy source and selectively to connect or disconnect a second electrical energy source with said first electrical energy source corresponding to the operating condition. Preferably, the system is configured such that the control device disconnects a second electrical energy source with said first electrical energy source when the energy level of the latter falls below a threshold value, and connects the second electrical energy source with said first electrical energy source when the energy level of the latter rises above a threshold value.

In another aspect, a system is disclosed comprising two or more electrical energy sources and a control device connected to and in communication with said electrical energy sources and a vehicle electrical system. The control device is configured to determine an operating condition of a first electrical energy source and selectively to connect or disconnect a second electrical energy source with said first electrical energy source corresponding to the operating condition. Preferably, the system is configured such that the control device connects and disconnects a second electrical energy source with said first electrical energy source in such a way as to regulate the transfer of energy between the first electrical energy source and the second electrical energy source until a threshold value is attained.

In one aspect, a method is disclosed comprising determining an operating condition of a vehicle and employing an appropriate number of electrical energy sources to satisfy the operating condition requirements. Preferably, the method includes sensing or receiving a signal from the vehicle electrical system to determine a vehicle operating condition. Such signals may contain information as to the status of the vehicle ignition switch, frequency of an alternating current of a generator in the vehicle, or a message from the vehicle computer network respecting priorities of electrical energy sources and electrical loads.

In another aspect, a method is disclosed comprising determining an operating condition of a vehicle and employing an appropriate number of electrical energy sources to satisfy the operating condition requirements. Preferably, the method includes sensing an energy level, or a rate of deliverable energy of the electrical energy sources, to employ an appropriate number of electrical energy sources.

In another aspect, a method is disclosed comprising determining an operating condition of a first electrical energy source and selectively connecting or disconnecting a second electrical energy source with the first electrical energy source which corresponds to the operating condition. Preferably, the method includes sensing a signal from the vehicle electrical system respecting the status of said first electrical energy source to determine its operating condition. Such signals may contain information as to the energy level of said first electrical energy source or a message from the vehicle computer network respecting the available energy that may be extracted from said first electrical energy source without overloading or detrimentally affecting same.

In another aspect, a method is disclosed comprising determining an operating condition of a first electrical energy source and selectively connecting or disconnecting a second electrical energy source with the first electrical energy source which corresponds to the operating condition. Preferably, the method includes disconnecting a second electrical energy source with said first electrical energy source when the energy level of the latter falls below a threshold value, and connecting the second electrical energy source with said first electrical energy source when the energy level of the latter rises above a threshold value.

In another aspect, a method is disclosed comprising determining an operating condition of a first electrical energy source and selectively connecting or disconnecting a second electrical energy source with the first electrical energy source which corresponds to the operating condition. Preferably, the method includes connecting and disconnecting a first electrical energy source to said second electrical energy source in such a way as to regulate the transfer of energy between the first electrical energy source and the second electrical energy source until a threshold value is attained.

The following claims define the present invention. The foregoing explanations, descriptions, illustrations, examples, and discussions regarding this invention have been set forth to demonstrate the utility and novelty of this invention and are by no means restrictive of its scope.

DETAILED DESCRIPTION OF THE PRESENTLY PREFERRED EMBODIMENTS

Figure 1:
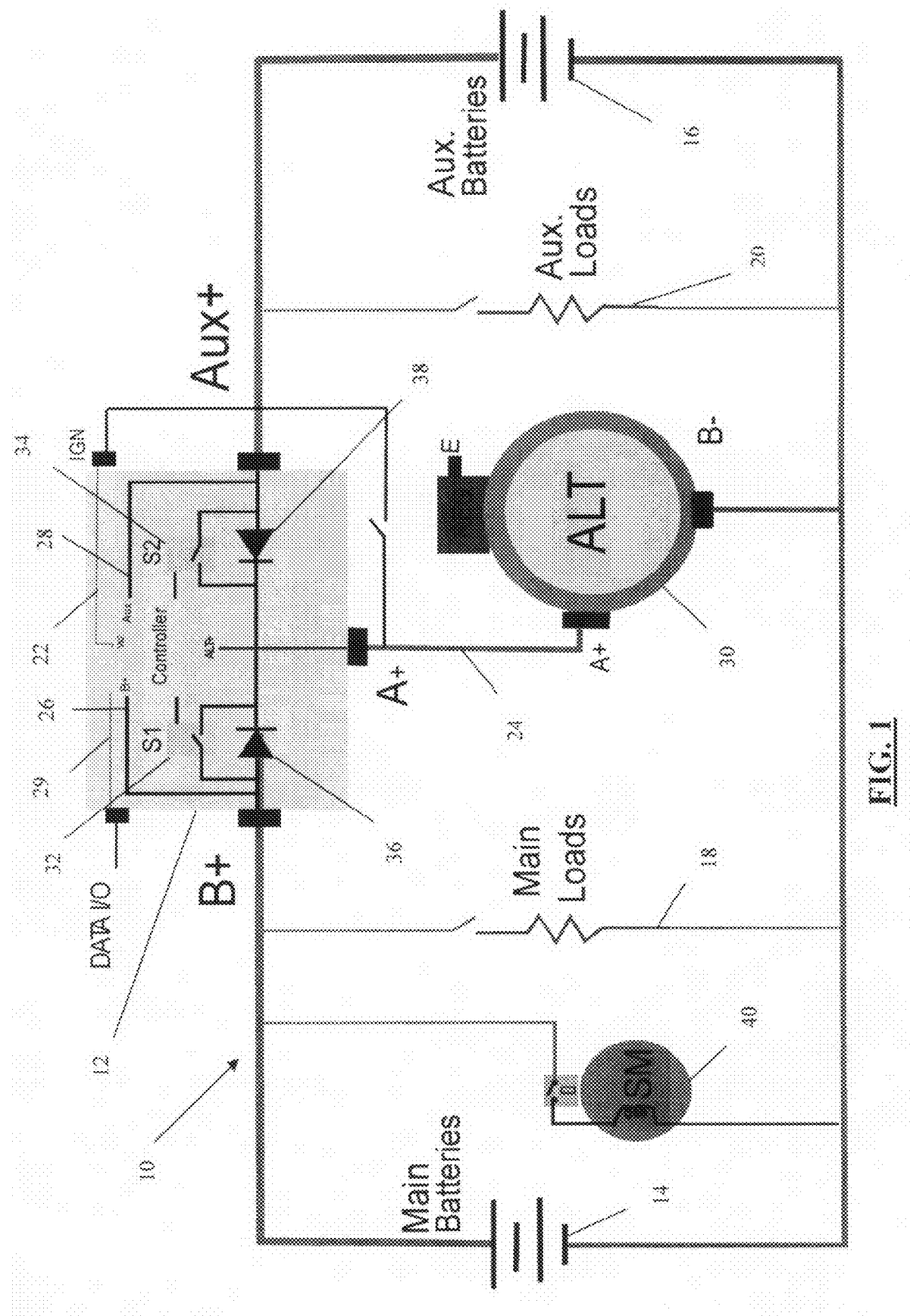
FIG. 1 shows a block diagram of a vehicle system according to a preferred embodiment.

FIG. 1 depicts a block diagram of a vehicle electrical system 10 including a preferred embodiment of the Electrical Energy Source Controller (EESC) 12. The vehicle electrical system 10 further comprises two electrical energy sources at 14 and 16. Electrical energy sources may include batteries, capacitors, generators, a commercial power source outlet, or any other source of electrical energy. System 10 further includes electrical loads 18 and 20. EESC 12 includes an input sense line 22 which is connected to the vehicle ignition switch for the purpose of determining a vehicle operating condition. EESC 12 further includes an input sense line 24 which is connected to a generator 30 where EESC 12 receives a signal in order to determine generator operating condition. Although in this embodiment generator 30 is utilized to provide EESC 12 information for determination of the generator or vehicle engine operating condition, said generator may be treated as a third electrical energy source in the vehicle electrical system. It is contemplated that in other embodiments, sense lines 22 or 24 may be connected to the vehicle computer network via a Data I/O port 29 where EESC 12 receives information as to the vehicle operating condition. Input sense lines 26 and 28 are connected to electrical energy sources 14 and 16 where EESC 12 receives information as to the status of said electrical energy sources. It is also contemplated that in other embodiments, sense lines 26 or 28 may be connected to the vehicle computer network via a Data I/O port 29 where EESC 12 receives information as to the status of the electrical energy sources for the purpose of employing an appropriate number of them to satisfy the vehicle operating condition. Yet in other embodiments, instead of input sense lines 22, 24, 26, and 28, a Data I/O port 29 may be connected to the vehicle computer network where EESC 12 receives sufficient information to determine the vehicle operating condition and the status of the electrical energy sources so that it may utilize an appropriate number of such sources to meet the requirement prescribed by the operating condition. Embedded in EESC 12 are two switches at 32 and 34, utilized by EESC 12 to engage an appropriate number of electrical energy sources 14 and 16, to meet the requirement of the operating condition. Said switches also serve as a means to isolate individual electrical energy source from other electrical energy sources and/or electrical loads. The switches are controllable to regulate the average current conducted by the switch. In other embodiments, multiple switches may be utilized effectively to isolate all electrical energy sources and electrical loads from one another. Diodes 36 and 38 are included to isolate individual electrical energy source from other electrical energy sources and/or electrical loads.

EESC 12 is connected to and in communication with the vehicle electrical system via input sense lines 22 and 24. These input sense lines provide EESC 12 means for ascertaining a myriad of operating conditions which may exist throughout the vehicle operating life. These operating conditions include periods when the vehicle engine is at rest, about to start, or operating. Although it is not feasible to provide an exhaustive list of different operating conditions, situations where the vehicle primary source of energy is mechanical, electrical, or solar, may be considered to be among them.

In one embodiment, input sense line 22 is connected to the vehicle ignition switch. If there is a signal present on line 22, it is indicative that the vehicle is either about to start or is operating. Input sense line 24 receives a signal from generator 30 which indicates the status of said generator. If there is an AC ripple present on line 24, it is indicative that the vehicle mechanical engine is operating and generator 30 is properly converting mechanical energy into electrical energy.

In one embodiment, both signals on input sense lines 22 and 24 are monitored and a determination is made as to the vehicle operating condition. If both input sense lines 22 and 24 are devoid of signals, EESC 12 interprets this situation as a vehicle at rest. This is critical for situations where EESC 12 must electrically isolate an electrical energy source to be utilized during engine cranking. If a signal is present on line 22, but there is no signal present on line 24, EESC 12 interprets the situation as a vehicle that is about to start. This is critical for devices that are utilized to engage the vehicle mechanical engine, for instance, a starter motor 40. In this scenario, EESC 12 may utilize one or a combination of electrical energy sources in the vehicle to provide the starter motor 40 with the maximum available electrical energy in the system. It is also desirable at this time to inhibit generator 30 operation by sending a signal from the Data I/O port 29 to inhibit a signal at Regulator E terminal. If both input sense lines 22 and 24 carry signals, then EESC 12 interprets the situation as a vehicle that is operating. This is critical for electrical energy sources, such as a generator, which are capable of converting mechanical energy into electrical energy. In this instance, EESC 12 may make a determination that the generator may be utilized as a first electrical energy source to be connected with a second electrical energy source to selectively connect or disconnect the latter with the first in response to said operating condition.

In one embodiment, one or both input sense lines 22 and 24 may be connected to the vehicle computer network via a Data I/O port 29 where EESC 12 may receive information as to the vehicle and/or electrical energy sources operating conditions. In one scenario, the vehicle computer network may transmit information as to status and priorities of electrical loads and/or electrical energy sources. EESC 12 may obtain other critical information such as vehicle primary source of energy via said Data I/O port. This information may be utilized by EESC 12 to satisfy the requirements commensurate with the vehicle operating conditions.

EESC 12 is connected to and in communication with the electrical energy sources 14 and 16 via input sense lines 26 and 28 to determine the status of said electrical energy sources. The signals on these input sense lines include, among others, available electrical energy or deliverable rate of energy.

In one embodiment, input sense lines 26 and 28 may carry signals proportional to the available energy in the electrical energy sources 14 and 16. An operating condition may require that an electrical energy source with the highest electrical energy be electrically isolated from the electrical system to be used during a particular event, such as to power starter motor 40 during a vehicle startup. Accordingly, EESC 12 manipulates the corresponding switch from switches 32 and 34 to an open-circuit position to accomplish the task. As stated above, a Data I/O port 29 may be connected to the vehicle computer network for EESC 12 to receive information regarding the available energy in the electrical energy sources 14 and 16.

In one embodiment, input sense lines 26 and 28 may carry signals proportional to the rate of deliverable electrical energy from the electrical energy sources 14 and 16. An operating condition may require that an electrical energy source with the highest deliverable rate of electrical energy be utilized to replenish a depleted electrical energy, such is the case when a battery may be utilized to recharge a depleted capacitor. As stated above, a Data I/O port 29 may be connected to the vehicle computer network for EESC 12 to receive information regarding the deliverable rate of energy from the electrical energy sources 14 and 16.

EESC 12 comprises two switches 32 and 34 to connect or disconnect an electrical energy source with another electrical energy source or an electrical load in order to satisfy an operating condition requirement. These switches also serve to isolate an electrical energy source or an electrical load from another electrical energy source or electrical load. These switches may be activated individually or in combination so that an appropriate number of electrical energy sources are employed to satisfy the operating condition. Additionally, switches 32 or 34 may be activated so that a first electrical energy source, selectively, may be connected or disconnected with the other electrical energy source so that the former may recharge the latter based on the operating condition.

In one embodiment, EESC 12 may set switch 34 on closed-circuit position so that electrical energy source 14 may supply electrical energy to electrical load 20 in addition to the amount being supplied by electrical energy source 16. This situation may occur when the vehicle is at rest and the operating condition, as determined above, dictate that electrical energy source 14 be utilized to satisfy the power requirement of load 20.

In one embodiment, EESC 12 may set switch 32 on closed-circuit position so that electrical energy source 16 may supply electrical energy to electrical load, namely starter motor 40, when the vehicle is about to start. As mentioned above, once the operating condition has been determined, EESC 12 examines the status of the electrical energy sources 14 and 16 and, activates switches 32 and/or 34 to meet the operating condition. If both electrical energy sources are fully charged, EESC 12 activates switches 32 and 34 so that both electrical energy sources supply electrical energy to the starter motor 40.

In one embodiment, EESC 12 may activate both switches 32 and/or 34, selectively connecting or disconnecting an electrical energy source 14 or 16 with generator 30, when the vehicle is operating. In this embodiment, generator 30 is utilized as a third electrical energy source in the vehicle electrical system. For instance, upon verification of the existence of an AC ripple on input sense line 24, EESC 12 becomes aware that generator 30 may be an electrical energy source candidate for replenishing electrical energy sources 14 and 16 with electrical energy. Upon a determination of the operating condition of generator 30, namely whether excess energy is available, EESC 12 activates sequentially or in concert, switches 32 and/or 34 to recharge electrical energy sources 14 and 16 according to the operating condition of generator 30.

In one embodiment, electrical energy source 14 may be a battery, electrical energy source 16 may be a capacitor, and a third electrical energy source 30 may be one that converts solar energy into electrical energy. Input sense line 22 may be connected to a sensor where EESC 12 obtains information that solar energy may rapidly become unavailable. Due to the time limitation and the fact that capacitors may be recharged much faster than batteries, EESC 12 sets switch 32 on open-circuit position to disconnect the electrical energy source 14 and electrical loads 18 and 36 from the vehicle electrical system, and selectively connects or disconnects, via switch 34, the capacitor 16 with said third solar powered electrical energy source to replenish capacitor 16.

Figure 2:
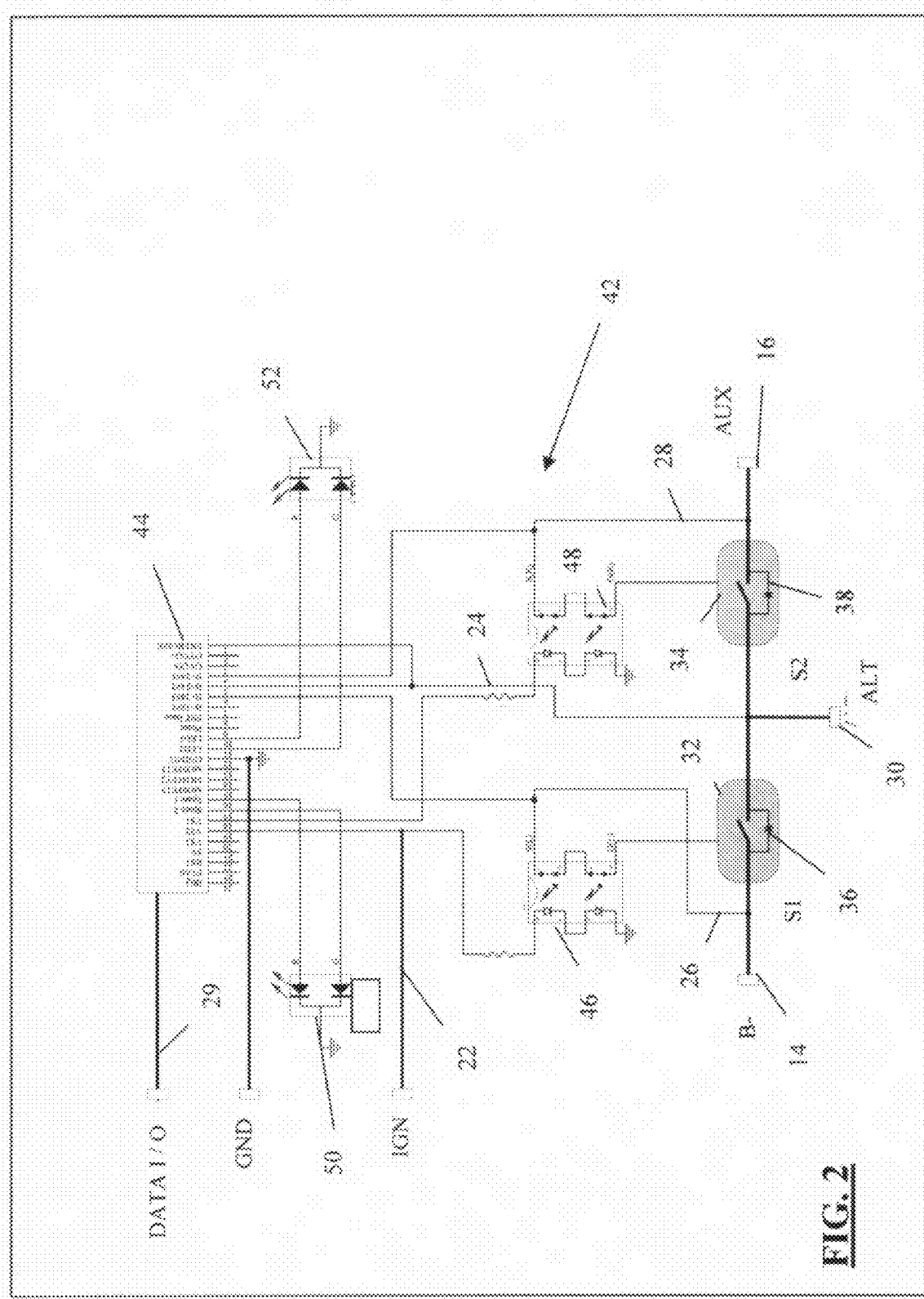
FIG. 2 is a schematic of one preferred Electrical Energy Source Controller for use in the vehicle electric system of FIG. 1.

FIG. 2 illustrates an embodiment of EESC 12 as a control device utilizing processor 44. In this embodiment, substantial part of the EESC's functions may be controlled solely by processor module 44. In other embodiments, multiple processors of the type such as the processor module 44, or other types, may be utilized to operate concurrently in parallel or series configurations to process and control the EESC functions. EESC 12 is not limited to digital processors. Analog or other discrete or integrated circuit components may be arranged to enable the EESC to perform the same functions as those performed by the digital processor. The processor module 44 preferably comprises a microprocessor, a processor clock, and a power supply. In one preferred embodiment, the microprocessor is a 68C08 processor having internal flash memory available from Motorola, Inc. of Schaumburg, Ill. The internal clock may be a crystal-type oscillator or other oscillator mechanism known to those practiced in the art, and the power supply may be a discrete or integrated circuit configured to supply the processor module 44 with appropriate DC voltage. It is contemplated that the processor module may be a combination of individual discrete or separate integrated circuits packaged in a single housing or it may be fabricated in a single integrated circuit.

In one embodiment, processor module 44 is in communication with the vehicle electrical system via input sense lines 22 in order to determine the vehicle operating conditions. In particular, processor module 44 monitors the vehicle ignition switch, via input sense line 22 to determine whether it has been activated. When the vehicle ignition switch is set on on-position, a voltage is present on line 22. The voltage level on the ignition line 22 is further conditioned for processor consumption. Processor 44 monitors line 22 and upon detection of the voltage, it determines that the vehicle is either about to start or operating. Although in this embodiment, processor 44 monitors a voltage level on line 22, in other embodiments, line 22 may be connected to the vehicle computer network via a Data I/O port 29 where processor module 44 receives data which, among others, contains information regarding the vehicle operating condition.

In one embodiment, processor 44 is in communication with the vehicle electrical system via input sense line 24 in order to determine the vehicle operating conditions. Specifically, input sense line 24 may be connected to the output of generator 30 where processor module 44 monitors the ripple frequency of the generator signal to compute a frequency which may be used to ascertain whether the vehicle is about to start or operating. In conjunction with input sense line 22, processor module 44 is capable of determining if the vehicle is at rest, about to start, or operating as discussed above. In other embodiments, processor module 44 may be connected to the vehicle computer network to determine the vehicle operating condition, via a Data I/O port 29.

In one embodiment, processor module 44 is in communication with electrical energy sources in the vehicle electrical system through input sense lines 26 and 28. Processor module 44 receives signals that contain information regarding the status and operating condition of electrical energy sources 14 and 16. Specifically, signals on lines 26 and 28 are conditioned for use by processor module 44 in form of voltage levels. Processor module 44 uses these signals to ascertain the voltage levels and rate of voltage level variations in order to decide which electrical energy sources should be employed to satisfy the operating condition.

In one embodiment, processor module 44 may examine the voltage level on lines 28 and 26 and compare them with a prescribed value. One or both electrical energy sources 14 and 16 may be utilized by activating switches 32 and 34 to supply electrical energy if the corresponding voltage level is above the prescribed value.

In one embodiment, processor module 44 may compare the rate at which the average voltage of electrical energy sources 14 and 16 varies with respect to time, while they are either being recharged or depleted. Such computations may be used to determine the rate of deliverable electrical energy so that processor module 44 may employ an appropriate number of electrical energy sources to meet the operating condition. Other means for performing such computations may be utilized such that input sense lines 26 and 28 carry information directly proportional to the rate of deliverable electrical energy. In other embodiments, processor module 44 may be connected to the vehicle computer network to receive information regarding the voltage level, rate of delivery, or priority level of individual electrical energy sources 14 and 16, over a Data I/O port 29 to evaluate the status and operating condition of said sources.

In one embodiment, processor module 44 utilizes switch modules 32 and 34 to employ an appropriate number of electrical energy sources that satisfies the vehicle operating condition. Two bi-directional semiconductor switching modules BSSMs 32 and 34 are embedded in EESC 12 in order to controllably connect and disconnect electrical energy sources 14 and 16 from the vehicle electrical system. The BSSMs are driven by opto-couplers 46 and 48 which are in turn controlled by processor 44. Opto-couplers 44 and 48 are utilized to isolate processor 44 from circuit noise.

In one embodiment, processor modules 44 closes switch 34 so that electrical energy source 14 may supply electrical energy to electrical energy source 16 and electrical load 20, in response to the operating condition as discussed above.

In another embodiment, processor 44 closes switch 32 so that electrical energy source 16 may supply electrical energy to electrical energy source 16 and electrical loads 18 and 40, in response to the operating condition as discussed above.

In one embodiment, processor 44 controllably manipulates switches 32 and/or 34 to selectively connect and disconnect electrical energy sources 14 and 16 with generator 30, so that the latter may recharge the former, in response to the operating condition as discussed above.

In one embodiment, processor module 44 may be connected to and in control of visual indicators such as light emitting diodes 50 and 52 which transmit information regarding the status of electrical energy sources 14,16, and 30, electrical loads 18, 20 and 40, vehicle operating conditions, or diagnostic information. These visual displays may be operated in the same manner as the warning light in automobiles, or they may be operated to display certain patterns, or they may be operated to display text, any which method may provide detailed information to the vehicle operator as to the status and operating conditions of various components.

Utilizing system 10 illustrated above, one embodiment of the operation of EESC 12 is now described. EESC 12 monitors the vehicle operating condition utilizing input sense lines 22 and 24. Input sense line is connected to the vehicle ignition switch and input sense line 24 is connected to the output of generator 30. Absence of signal on these lines indicates that vehicle is at rest. EESC 12 accordingly sets both switches 32 and 34 on open-circuit position so that electrical energy sources 14, 16, and 30 and their corresponding electrical loads become electrically isolated from one another.

In one situation, electrical energy source 16 may become severely depleted due to excess use, defect, or short circuit. When the vehicle ignition switch is set on off-position and generator 30 is not producing power, EESC 12 recognizes the absence of a signal on the ignition switch and on the AC output of generator 30 and interprets the operating condition as a vehicle that is at rest. EESC 12 then checks the status of electrical energy sources 14 and 16 utilizing input sense lines 26 and 28 and closes switch 32 and 34 to supply electrical load 20 with electrical energy from both electrical energy sources 14 and 16. In one embodiment, additional switches and/or diodes may be utilized to electrically isolate individual electrical energy sources and electrical loads, so that a particular electrical energy source anywhere in the electrical system may be connected to an electrical load. For example, in FIG. 1, system 10 may be configured so that there are additional switches between electrical energy source 14 and electrical loads 18 and 40, and electrical energy source 16 and electrical load 20, so that under the above vehicle operating condition, EESC 12 may connect electrical energy source 14 directly to electrical load 20 without the former sharing electrical energy with any other electrical energy source or electrical load.

In one situation, electrical energy source 14 may become severely depleted due to excess use, defect, or short circuit. When the vehicle ignition switch is set on on-position while generator 30 is not yet producing power, EESC 12 recognizes the presence of a signal on the ignition switch and lack of a voltage ripple on the output of generator 30 and interprets the operating condition as a vehicle that is ready to be started. EESC 12 will then check the status of electrical energy sources 14 and 16 utilizing input sense lines 26 and 28 and closes switch 32 and 34 to supply starter motor 40 with electrical energy from both electrical energy sources 14 and 16. In one embodiment, additional switches and/or diodes may be utilized to electrically isolate individual electrical energy sources and electrical loads, so that a particular electrical energy source anywhere in the electrical system may be connected to an electrical load. For example, in FIG. 1, system 10 may be configured so that there are additional switches between electrical energy source 14 and electrical loads 18 and 40, and electrical energy source 16 and electrical load 20, so that under the above vehicle operating condition, EESC 12 may connect electrical energy source 16 directly to electrical load 40 without the former sharing electrical energy with any other electrical energy source or electrical load.

In one situation, electrical energy sources 14 and 16 are both fully charged. When the vehicle ignition switch is set on on-position while generator 30 is not yet producing power, EESC 12 recognizes the presence of a signal on the ignition switch and lack of a signal on the output of generator 30 and interprets the operating condition as a vehicle that is ready to be started. EESC 12 then checks the status of electrical energy sources 14 and 16 utilizing input sense lines 26 and 28 and closes switch 32 and 34 to supply starter motor 40 with electrical energy from both electrical energy sources 14 and 16. This is desirable especially in low temperatures because starter motor 40 may draw electrical energy from both electrical energy sources 14 and 16.

In one situation, electrical energy sources 14 and/or 16 may become severely depleted due to excess use, defect, or short circuit. When the vehicle ignition switch is set on on-position while generator 30 is producing power, EESC 12 recognizes the presence of a signal on the ignition switch and a ripple frequency on the output of generator 30 and interprets the operating condition as a vehicle that is operating. EESC 12 then checks the status of electrical energy sources 14 and 16 utilizing input sense lines 26 and 28 and controllably closes switch 32 and 34 sequentially or in concert, selectively connecting electrical energy sources 14 and 16 with electrical energy source 30, to replenish the former with energy from the latter.

Figure 3:
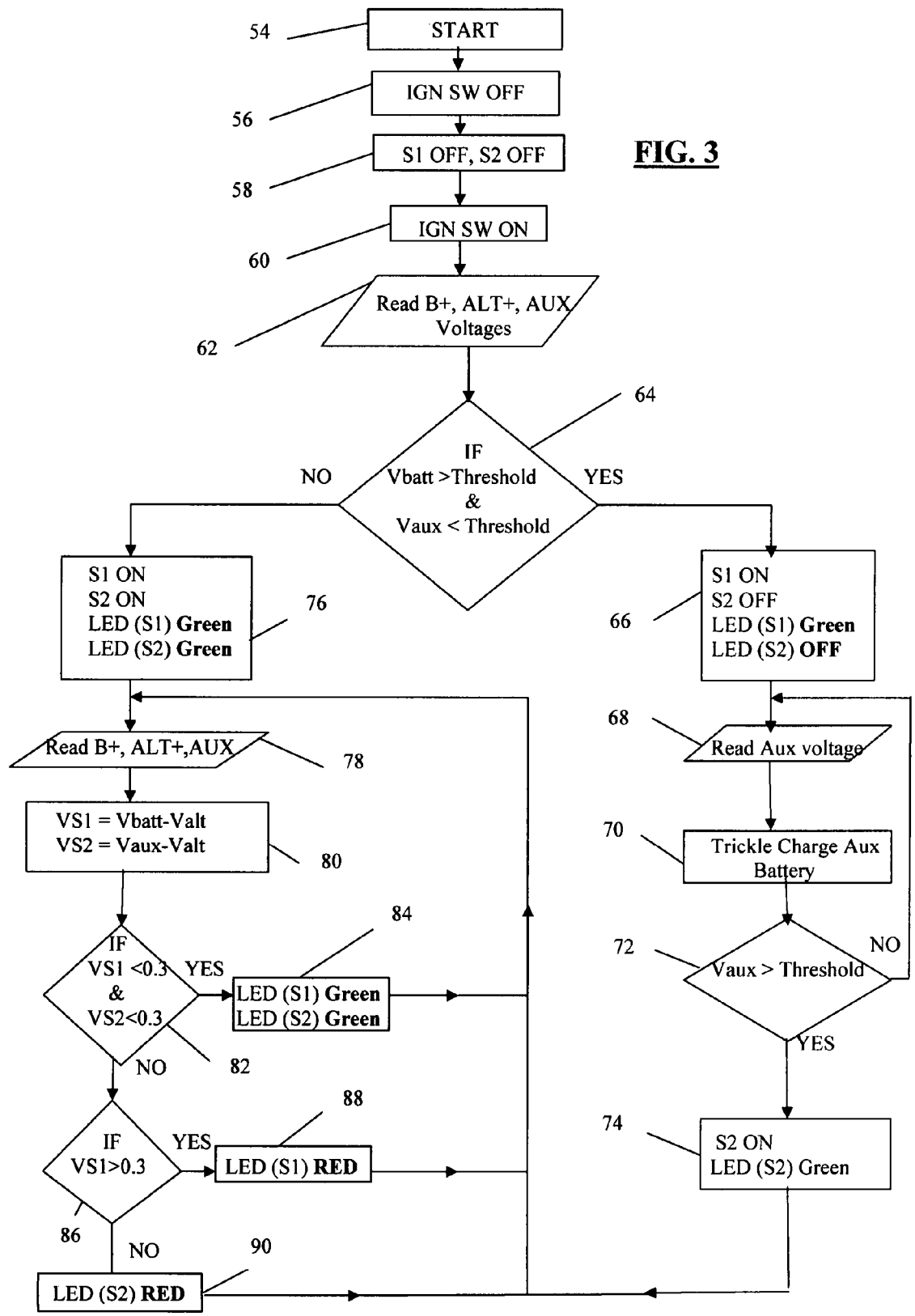
FIG. 3 is a flow chart illustrating preferred methods of controlling electrical energy sources in the electrical system of FIG. 1.

FIG. 3 illustrates an example of one method of implementing the EESC 12. Upon power up at 54, EESC 12 monitors the status of the vehicle ignition switch. If the switch is on off-position, EESC 12 sets switches 32 and 34 on off-position, at 56 and 58, so that electrical energy sources and their corresponding electrical loads become isolated. If the vehicle ignition switch is set on on-position, at 60, EESC 12 continues to scan input sense lines 24, 26, and 28 to determine the status and operating conditions of the generator 30 and electrical energy sources 14 and 16, at 62 respectively.

Upon obtaining the voltage levels of said generator and electrical energy sources, EESC 12 compares the voltage levels of electrical energy sources 14 and 16 with a threshold value at 64. If the voltage level of electrical energy source 14 is greater and that of 16 is less than the threshold value, EESC 12 sets switch 32 on on-position and switch 34 on off-position and further setting the light emitting diode (LED) clusters 50 and 52 such that the LED corresponding to switch 32 is turned on to illuminate a green light and LED corresponding to switch 34 is turned off, at 66.

EESC 12 continues with monitoring the voltage level of electrical energy source 16 at 68, and selectively connects and disconnects generator 30 with electrical energy source 16, at 70, and continues steps 68 and 70 until the voltage level of electrical energy source 16 reaches a value above a threshold value, at 72. Once this condition is satisfied, EESC 12 closes switch 34 and turns on the LED corresponding to switch 34 to illuminate a green light, at 74. EESC 12 then continues executing steps 78 through 90 which are discussed below.

If the voltage level of electrical energy source 14 is not greater and that of 16 is less than the threshold value, EESC 12 sets switches 32 and 34 on on-position and further setting the light emitting diode clusters 50 and 52 such that each LED corresponding to switches 32 and 34 is turned on to illuminate a green light, at 76.

EESC 12 continues to scan input sense lines 24, 26, and 28 to determine the status and operating conditions of the generator 30 and electrical energy sources 14 and 16, at 78 respectively. EESC 12 continues by determining two reference voltages, VS1 and VS2, corresponding to the differences between electrical energy sources 14 and 16, and generator 30, respectively at 80. If VS1 is greater and VS2 is less than a prescribed value, for example 0.3 Volts at 82, EESC 12 turns on LED clusters 50 and 52 such that each LED corresponding to switches 32 and 34 is turned on to illuminate a green light at 84.

EESC 12 continues to execute steps 78 through 84 until reference voltage VS1 is above the threshold at 86, at which time the LED corresponding to switch 32 is turned on to illuminate a red light at 88. EESC 12 continues to execute steps 78 through 88 until reference voltage VS1 is less than and VS2 is greater than the threshold value, at which time EESC 12 turns on the LED corresponding to switch 34 to illuminate a red light at 90. EESC 12 continues to execute steps 78 through 90 according to various vehicle operating conditions.

The forgoing discloses a system and method for controlling electrical energy sources in a vehicle. It describes two fundamental functions of the invention, namely a system and method which employs an appropriate number of electrical energy sources to satisfy the vehicle operating conditions. Secondly, it describes a system and method which maintains standby electrical energy sources in an optimum state of readiness.

The first function addresses the problem of the existing systems where multiple electrical energy sources are employed based on a presupposed vehicle operating condition, incapable of adapting itself to changes in the vehicle operating condition. This invention constantly monitors the vehicle electrical system at all times and appropriately engages the electrical energy sources to satisfy the vehicle operating conditions.

The second function addresses the problem of extracting energy from an electrical energy source and distributing it among other electrical energy sources without detrimental effects on the former. This task is achieved by monitoring the operating conditions of all the electrical energy sources in the vehicle and distributing electrical energy from those that are ready to supply it to those that are ready to receive it.

The examples and illustrations have been used to assist the reader with understanding this invention and not intended to limit the scope of it. It is the following claims, including all equivalents, which are intended to define the scope of this invention.

What is claimed is:

1. A system for controlling electrical energy sources in a vehicle, comprising;
   (a) two or more electrical energy sources;
   (b) a control device connected to and in communication with said electrical energy sources;
   said control device determining an operating condition of a first electrical energy source and selectively connecting or disconnecting a second electrical energy source without detrimentally affecting said operating condition.

2. The system of claim 1, wherein (a) comprises a generator.

3. The system of claim 1, wherein (b) comprises means for sensing an energy level of the first electrical energy source to determine said operating condition.

4. The system of claim 3, wherein the control device detects a voltage level of said first electrical energy source via said sensing means.

5. The system of claim 3, wherein the control device connects the second electrical energy source with said first electrical energy source when said energy level is above a threshold value.

6. The system of claim 3, wherein the control device disconnects the second electrical energy source with said first electrical energy source when said energy level falls below a threshold value.

7. The system of claim 1, wherein the control device selectively connecting or disconnecting two or more electrical energy sources.

8. A system for controlling electrical energy sources in a vehicle, comprising;
   (a) two or more electrical energy sources; and
   (b) means for controlling said electrical energy sources;
   said means for controlling determining an operating condition of a first electrical energy source and selectively connecting or disconnecting a second electrical energy source without detrimentally affecting said operating condition.

9. A control device for controlling two or more electrical energy sources in a vehicle, comprising;
   means for switching an electrical energy source; and
   a processor including a programming code operable on the processor;
   said processor determining an operating condition of a first electrical energy source and selectively connecting or disconnecting a second electrical energy source with said first electrical energy source via said switching means without detrimentally affecting said operating condition.

10. The control device of claim 9, wherein said processor comprises an input sense line coupled with said first electrical energy source to determine said operating condition.

11. The control device of claim 10, wherein said processor detects an energy level of said first electrical energy source via said input sense line.

12. The control device of claim 11, wherein said processor connects the second electrical energy source with said first electrical energy source when said energy level is above a threshold value.

13. The control device of claim 11, wherein said processor disconnects the second electrical energy source with said first electrical energy source when said energy level falls below a threshold value.

14. The control device of claim 9, wherein said processor selectively connecting or disconnecting two or more electrical energy sources.

15. A control device for controlling two or more electrical energy sources in a vehicle, comprising;
   means for switching an electrical energy source; and
   processing means for determining an operating condition of a first electrical energy source;
   said processing means selectively connecting or disconnecting a second electrical energy source with said first electrical energy source via said switching means without detrimentally affecting said operating condition.

16. A method for controlling two or more electrical energy sources in a vehicle, comprising;
   (a) determining an operating condition of a first electrical energy source; and
   (b) selectively connecting or disconnecting a second electrical energy source with said first electrical energy source without detrimentally affecting said operating condition.

17. The method of claim 16, wherein (a) comprises sensing an energy level of said first electrical energy source to determine said operating condition.

18. The method of claim 17, wherein (b) comprises connecting the second electrical energy source with said first electrical energy source when said energy level is above a threshold value.

19. The method of claim 17, wherein (b) comprises disconnecting the second electrical energy source with said first electrical energy source when said energy level falls below a threshold value.

20. The method of claim 16, wherein (b) comprises selectively connecting or disconnecting two or more electrical energy sources.

* * * * *